Figure 1:
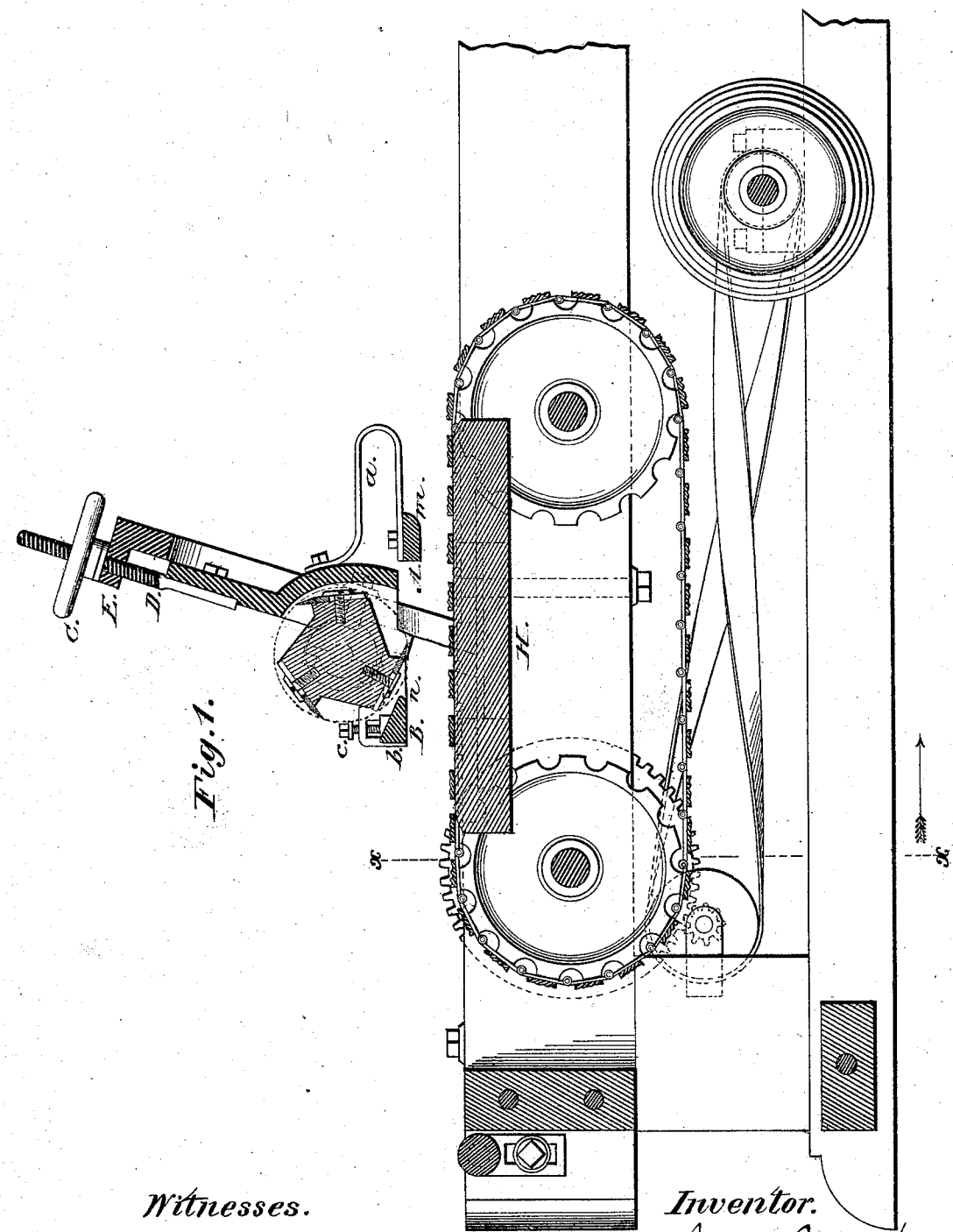

3 Sheets--Sheet 3.

P. WOODBURY.
Planing-Machines.

No. 138,462. Patented April 29, 1873.

Witnesses.
Edw. N. Down
M. Gardner

Inventor.
Joseph P. Woodbury
per Fisher & Duncan
attys.

UNITED STATES PATENT OFFICE.

JOSEPH P. WOODBURY, OF BOSTON, MASSACHUSETTS.

IMPROVEMENT IN PLANING-MACHINES.

Specification forming part of Letters Patent No. 138,462, dated April 29, 1873; application filed December 5, 1870.

*To all whom it may concern:*

Be it known that I, JOSEPH P. WOODBURY, of Boston, in the county of Suffolk and State of Massachusetts, have invented a new and useful Improvement in Planing-Machines, of which the following is a specification:

The object of my present improvement in planing-machines is to present the material to the cutter in such a manner as both to counteract, as far as practicable, the "fluttering" or tremor caused by the successive blows of the knives, and the consequent wavy and uneven surface of the planed work, and at the same time to overcome more perfectly than heretofore the tendency in the knives of the rotary cutter to loosen and dislodge the knots and "shakes," and to tear the fibers of the wood irregularly, instead of severing them smoothly along the exact surface desired. To effect this two-fold object I make use of a device which I style a "yielding pressure-bar," which possesses the following characteristics, viz.: It is made of such material, and has such mass as to be rigid from end to end; its under face is made flat, so that it has an extended bearing upon the work longitudinally of the machine; and it is mounted upon springs so as, within certain limits, to accommodate itself to the varying inequalities in the surface of the material being operated on. A pressure-bar thus constructed and mounted differs from a pressure-roller for holding down material in planing-machines in the following essential particulars: First, there is less liability to become coated with the gums of the wood; second, there is no danger, as with the roller, that chips and other small fragments will be caught under it and pressed down into the planed surface of the wood; third, by reason of its extended bearing, it is more efficient to check the tremulous motion of the material under the rapid and powerful blows of the knives than the roller, the form of which is such that its bearing upon the work is necessarily along a single line only; and, fourth, the bar can be made to exert its pressure at points much nearer to the edge of the knives than would be attainable with the roller. This last point of difference is one of great practical importance. As the knives cut toward the unplaned portion of the stock, a large part of their work being performed during their ascent, there is a constant tendency for them to unseat the knots and tear out the shakes and the loose and irregular fibers of the wood; hence the great desirability of bringing a strong pressure to bear in immediate proximity to the line along which the knives are operating—a result which is impossible when the roller is used, but with the bar is entirely feasible.

Besides the pressure-roller for holding down material in planing-machines, I am aware that it is proposed, in the English patent of Burnett of 1839, to make use of a flat spring arranged transversely of the machine, and supported along its upper edge upon a bar which has a vertical adjustability. One essential difference between such a device and my pressure-bar is found in the fact that the latter is perfectly rigid from end to end, from which it results that, when the knives begin to lift a knot or shake or sliver, the entire force of the springs that support the bar is concentrated at the special point thus threatened, and thereby holds the weakened part in place. In like maner this element of rigidity in the bar causes the entire strength of the springs to be concentrated upon any warp that may occur in one edge or in the middle of the material, which is thus reduced to a true bearing on the bed or the carriage of the machine. A flat pressure-spring, on the other hand, having the same elasticity in all directions, will yield transversely of the work as well as in a vertical direction, and, as a consequence, only a small part of its power can be brought to bear at a particular point, as with the stiff bar, to force the warped material to a true bearing on the machine or to counteract the tendency of the cutter to tear out the knots and other weak parts. Another difference between the bar and the spring is, that the bearing of the latter upon the work, as in the case of the pressure-roller, is only a line.

The mode in which I apply my invention is fully illustrated in the accompanying drawing, in which—

Figure 2:
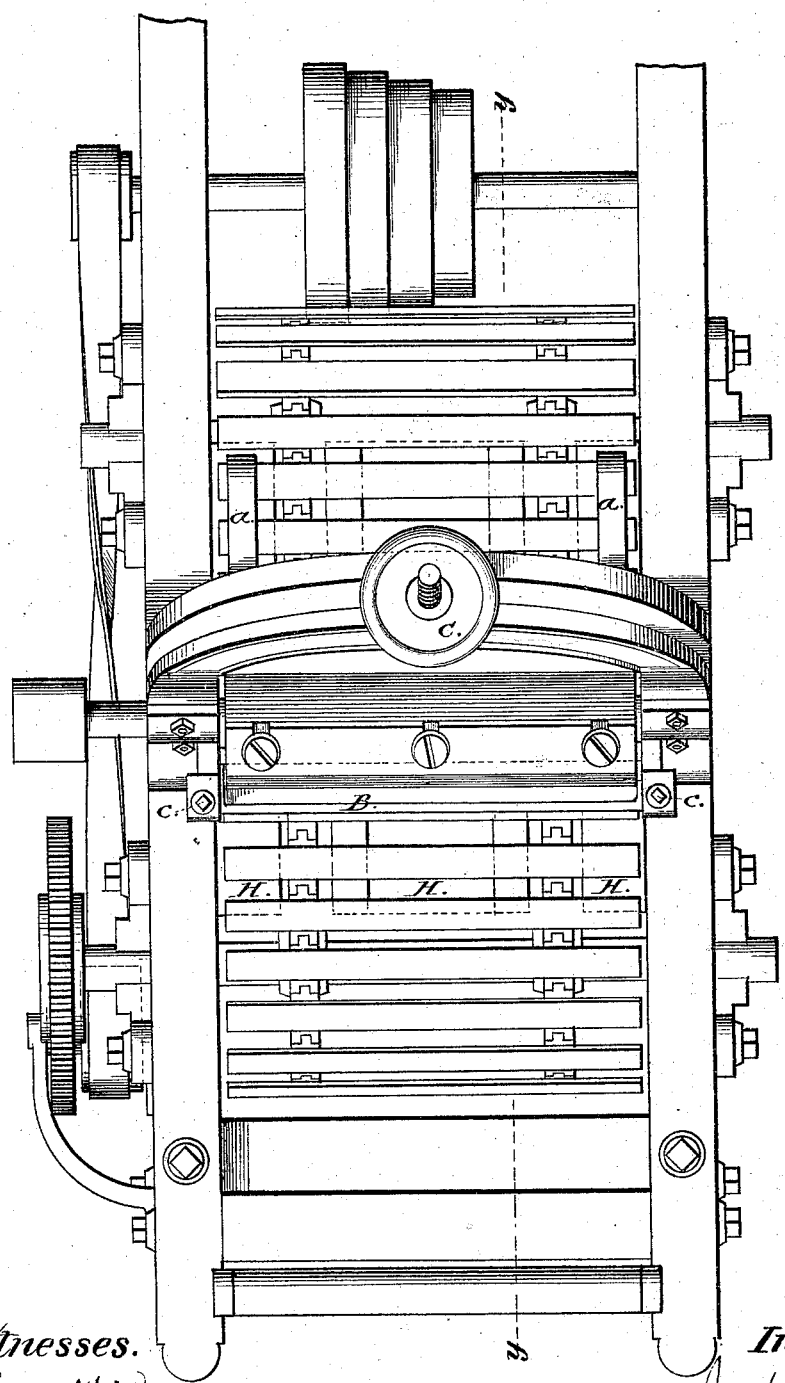
Figure 3:
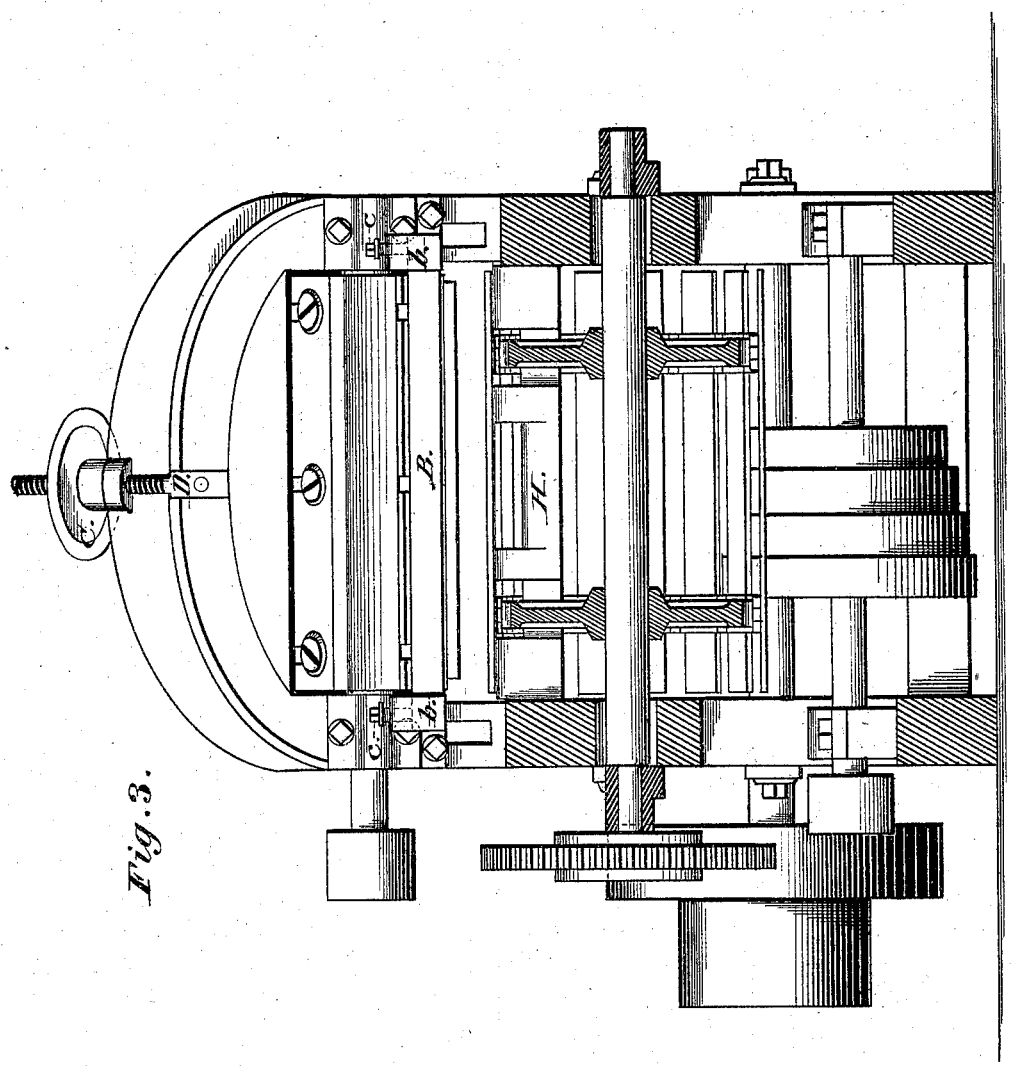

Figure 1 represents a longitudinal vertical section of a planing-machine through the line *y y* of Fig. 2. Fig. 2 is a plan view of the machine. Fig. 3 represents a transverse vertical section on the line x x of Fig. 1.

As my present invention has nothing to do with the frame-work of the machine or with the parts specially designed for receiving and transmitting the power, these parts do not require to be described.

A represents one of my yielding pressure-bars, which is shown in the drawing as set off at some distance from the path of the knives; but this is done in order to show it more distinctly. In practice it is to be brought much nearer to the cutter, leaving only sufficient space between it and the path of the knives to give it the requisite vertical play to enable it to conform to the irregularities of the stuff which is being planed. As this bar is specially designed to hold down the unplaned part of the material, it is provided with a spring at each end, here marked $a\ a$, some such compensating device being essential to the successful working of a bar occupying this position, by reason of the varying thickness of the rough stock. When, however, the bar is used to hold down the planed part of the stuff, inasmuch as the thickness of this portion has been reduced by the action of the cutter to an approximate uniformity, the springs may be dispensed with, and the bar supported at the end of two arms extending out from the cutter-frame. The elasticity of the metal composing these arms will ordinarily be sufficient to compensate for any actual variation from absolute uniformity of thickness in the planed material. B represents a pressure-bar of this description supported on the arms $b\ b$. These arms, as well as the springs $a\ a$ that support the bar A, are shown as attached to the frame that carries the cutter, from which it follows that both these bars will receive the same vertical adjustment as the cutter, and simultaneously with it, which is effected by means of the hand-nut C and the threaded rod D passing up through the arm E. The bar B is made capable of a separate vertical adjustment by means of the screws $c\ c$.

In order to facilitate the entrance of the work beneath the bars, one of the lower edges of each bar is slightly beveled or rounded, as shown at $m$ and $n$.

Directly underneath the cutter is the traveling bed or apron, which rests upon the solid and unyielding bed-plate H, which is designed to act as an anvil just under the point where the successive blows of the knives are delivered upon the material subjected to their action, and which is so constructed as effectually to resist the springing or yielding of the material in a downward direction. This bed-plate is extended far enough in front and in rear of the cutter to serve as a firm support under the pressure-bars A and B.

The stuff is carried forward to the cutter by means of an endless apron revolving upon suitable shafts or rollers. This apron is composed of two or more endless belts or chains, to which are attached transverse slats or bars of metal. The bed-plate is cut away at the points where these belts or chains pass over it, so that the transverse metal slats as they are carried across the face of the bed-plate, may be in direct contact therewith.

What I claim as my invention is—

1. The combination of a rotary cutter and a yielding pressure bar or bars, substantially as and for the purpose described.

2. The combination of a solid bed and a yielding pressure bar or bars, for the purpose of holding down the material while being acted on by the cutter, substantially as set forth.

3. The combination of a solid bed, a rotary cutter, and a yielding pressure bar or bars, substantially as described.

4. The combination of the two pressure-bars, one of which is supported upon arms, and the other upon springs, substantially as and for the purpose set forth.

JOSEPH P. WOODBURY.

Witnesses:
FRANK G. PARKER,
WILLIAM EDSON.